(12) United States Patent
Dickinson et al.

(10) Patent No.: US 10,764,168 B1
(45) Date of Patent: Sep. 1, 2020

(54) ADJUSTING COMMUNICATIONS PARAMETERS BASED ON KNOWN CHARACTERISTICS

(71) Applicant: Amazon Technologies, Inc., Reno, NV (US)

(72) Inventors: Andrew Bruce Dickinson, Seattle, WA (US); Matthew Shawn Wilson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 707 days.

(21) Appl. No.: 14/041,994

(22) Filed: Sep. 30, 2013

(51) Int. Cl.
*G06F 15/173* (2006.01)
*H04L 12/26* (2006.01)

(52) U.S. Cl.
CPC ................ *H04L 43/0882* (2013.01)

(58) Field of Classification Search
CPC .................................................. H04L 43/0882
USPC ........................................................ 709/224
See application file for complete search history.

(56) References Cited

U.S. PATENT DOCUMENTS

| | | | | |
|---|---|---|---|---|
| 7,715,324 B1* | 5/2010 | Harvell | ............. | H04L 29/12594 370/252 |
| 7,849,208 B2* | 12/2010 | Elzur | ...................... | H04L 29/06 370/412 |
| 2011/0170433 A1* | 7/2011 | Scobbie | .............. | H04L 43/0829 370/252 |
| 2014/0215058 A1* | 7/2014 | Vicat-Blanc | ............ | H04L 43/14 709/224 |
| 2014/0281018 A1* | 9/2014 | Waclawsky | ........... | H04L 47/193 709/235 |
| 2014/0330982 A1* | 11/2014 | Jalan | ................... | H04L 63/0892 709/229 |

* cited by examiner

*Primary Examiner* — Ario Etienne
*Assistant Examiner* — Sahera Halim
(74) *Attorney, Agent, or Firm* — BakerHostetler

(57) ABSTRACT

Techniques are disclosed for determining for determining parameters for a Transmission Control Protocol (TCP) connection between two computing nodes before the connection is established. In embodiments, the latency of data transmission between two computing nodes and the throughput capacity of a network link are measured, and from this data, TCP parameters for a future network connection between two computing nodes are determined. This information is sent to a TCP stack that stores it in its route table. Then, the TCP stack uses TCP parameters based on the information stored in the route table.

26 Claims, 10 Drawing Sheets

|     | Destination 202 | Network Mask 204 | Gateway 206 | Interface 208 | Hints 210 |
|-----|-----------------|------------------|-------------|---------------|-----------|
| 212 | 0.0.0.0 | 0.0.0.0 | 192.168.0.1 | NIC | FAR |
| 214 | 127.0.0.0 | 255.0.0.0 | 127.0.0.1 | Loopback | NEAR |
| 216 | 127.0.0.1 | 255.255.255.255 | 127.0.0.1 | Loopback | NEAR |
| 218 | 192.168.2.0 | 255.255.255.0 | 192.168.0.1 | NIC | FAR |
| 220 | 192.168.2.1 | 255.255.255.0 | 192.168.0.1 | NIC | NEAR |
| 222 | 192.168.2.2 | 255.255.255.0 | 192.168.0.1 | NIC | FAR |

200
Route Table

ADJUSTING COMMUNICATIONS PARAMETERS BASED ON KNOWN CHARACTERISTICS

BACKGROUND

There are various network protocols used to transmit data between computers. One such protocol is Transmission Control Protocol (TCP). A computer generally uses a TCP stack to communicate with another computer via a TCP protocol. A TCP stack generally has default parameters used for connections with all other computers, as well as parameters that may be adjusted on a per-connection basis, based on what is occurring in a particular connection.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIG. 2 depicts an example route table containing TCP parameters that may be used by computing nodes in the example operating environment of FIG. 1 when implementing embodiments;

DETAILED DESCRIPTION

Figure 1:
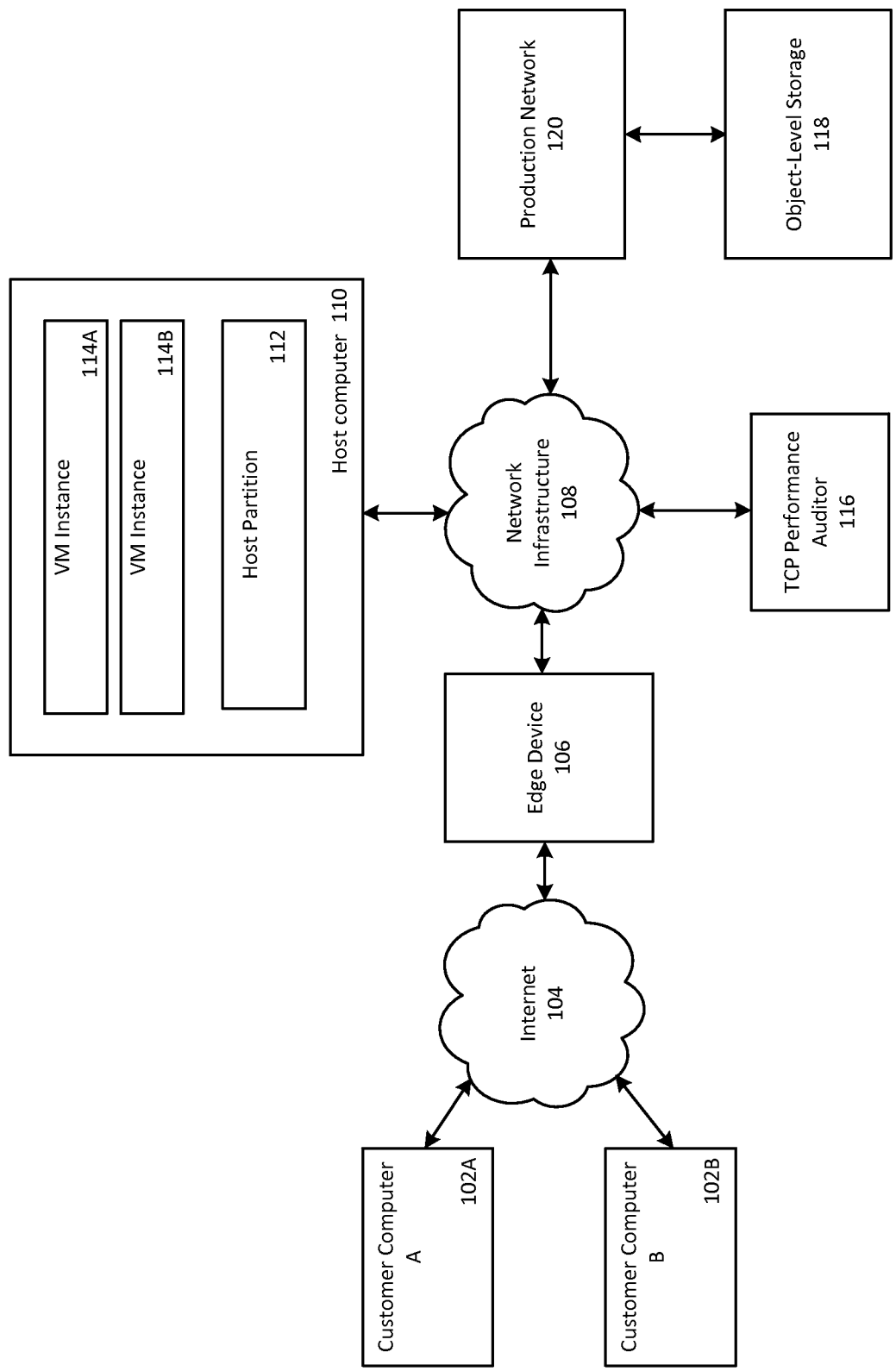
FIG. 1 depicts an example operating environment in which embodiments may be implemented.

One problem with TCP settings is that they may not be appropriate for a given network configuration (e.g., a latency for transmitting a packet between two computers on the network, or a throughput capacity of a network link on the network), and a different configuration could improve the speed and throughput of data transmission. While there are some parameters that may be adjusted during a TCP connection, like window size, it may take some time to adjust those parameters during the connection, and during this period of adjustment the configuration could still be improved (as used herein, a TCP parameter may include a TCP option, as well as a non-negotiated value, such as round-trip time (RTT)). For example, let there be a 10 Gb/s connection between two computing nodes. It may be that initial TCP parameters are not set to take advantage of that bandwidth, though the TCP protocol will lead to those parameters being ramped up over a period of 20 seconds until they are set to take advantage of that bandwidth. With a transfer rate of 10 Gb/s, 20 seconds of sub-optimal transfer may result in a lot of potentially transferred data that is not transferred in that ramp up period.

This is one way in which the present techniques differ from prior TCP implementations that do achieve optimal (or semi-optimal) values for TCP parameters, but do so through a ramp up period where a connection initially begins with sub-optimal values. In contrast, in the present techniques, the values to use for TCP parameters in a given connection are determined before that connection is established, so there is no ramp up period involved, and the optimal (or semi-optimal) values are used from the beginning of the TCP connection, resulting in greater data throughput.

In addition to window size, examples of parameters that may have their values determined according to the present techniques include round-trip time (RTT), maximum segment size (MSS), packet loss and retransmission rates, and default timeout parameters that determine how long a TCP stack will wait before attempting to retransmit or retry a packet, or other piece of data. These parameters may include (1) TCP options (such as MSS) that may be negotiated between two computing nodes in the process of the SYN/SYN-ACK/ACK exchange to establish a TCP connection; and (2) non-negotiated, or independently computed, parameters (such as RTT), where one computing node is able to set a value of a parameter without negotiating with another computing node.

Embodiments described herein are used to determine default TCP parameters for computers in a network before those computers begin a TCP connection, which may improve the speed and throughput of data transmission. A problem with some of the default values of TCP parameters is that they are based on an assumption of a number of worst-case scenarios, like the latency of packets across a highly latent link (e.g., a link that travels half-way around Earth). So, these default values may be several orders of magnitude higher than what may be ideal for traffic that may remain inside of a data center or between a source and destination that are in close physical proximity. In this manner of adjusting the values of TCP parameters, these more optimal TCP parameters may be pre-determined and used from the beginning of the TCP connection, thus avoiding the sub-optimal period where parameters are adjusted at the beginning of a TCP connection.

Additionally, while default, or initial, values of TCP parameters may be adjusted, there is currently no mechanism to adjust these values for a subset of traffic being transmitted (e.g., adjusting the values for traffic that will remain within a datacenter, and using the default values for externally-bound traffic). The present techniques enable the use of initial values for TCP parameters to be set as narrowly as on a per-connection basis—where a given parameter is specified for a particular connection between a particular source computing node and a particular destination computing node.

These TCP parameters may be calculated based on, for example, a latency associated with sending data between two computing nodes, a maximum throughput capacity of data sent between the two computing nodes, or a hardware or software configuration of the computing nodes. In embodiments, the TCP parameters (or characteristics of a network link that are used to determine TCP parameters)

may be determined empirically, based on modeling a network on which the two computing nodes communicate, or based on TCP parameters that have been determined for similarly situated computing nodes or computing nodes that share a commonality (e.g., for a computing node on the same hardware rack that is connected to the same switch). In other embodiments, these TCP parameters (or characteristics) may be determined through an automatic discovery process that is independent of either performing tests to determine empirical information about the network, or by modeling the network. In yet other embodiments, these TCP parameters (or characteristics) may be determined based on receiving user input indicative of the TCP parameters or characteristics.

While the embodiments described herein generally deal with TCP communications, it may be appreciated that these techniques may be applied to forms of networking protocols that have parameters with adjustable values, but which are not a TCP protocol.

FIG. 1 depicts an example operating environment in which embodiments may be implemented. More detail about the operating environment, including more detail about individual components within the operating environment of FIG. 1 is given with respect to FIGS. 8-10. Generally, the operating environment of FIG. 1 includes a multi-customer web services platform that comprises multiple virtual machine instances executing on multiple host computers (the instances and host computers may both be described as being computing nodes), with a TCP performance auditor 116 that determines values for TCP parameters used by the computing nodes in communicating with each other.

Customer computer A 102A and customer computer B 102B are computers possessed by customers, which are configured to access the multi-customer web services platform via a public network, e.g. Internet 104. In turn, the connection point between the multi-customer web services platform and Internet 104 is edge device 106. In embodiments, edge device 106 may be a gateway router. Within the multi-customer web services platform, edge device 106 connects to another computer network—network infrastructure 108. Network infrastructure 108 may be an intranet that is separate from Internet 104. Also connected to network infrastructure 108 are TCP performance auditor 116, production network 120, object-level storage 118 (via production network 120) and host computer 110.

Host computer 110 is configured to execute one or more virtual machine instances (depicted here as VM instance 114A and VM instance 114B) and a host partition 112. While host computer 110 is depicted here as executing two VM instances 114, it may be appreciated that host computer 110 may execute more or fewer VM instances.

In embodiments, a customer directs the multi-customer web services platform to execute one or more VM instances on the customer's behalf. These VM instances may then execute to perform functions for the customer, such as a function of a web server for the customer's web site, or to perform compute functions, such as encoding video.

In addition to this aspect of the web services platform, customers may also store data in object-level storage 118. Object-level storage 118 is depicted as storing data as objects (e.g., a customer instructs the web services platform to store or retrieve a specific file). It may be appreciated that there are embodiments where a block-level storage service is implemented instead of, or in addition to, object-level storage 118. Object-level storage 118 may also be used by other devices on the web services platform to store data. For example, as described in more detail herein below, auditor 116 may store data on object-level storage 118 in the process of auditing IP addresses (e.g., auditor 116 may store database tables that identify IP address prefixes and a purported use for those prefixes).

As depicted, production network 120 may be used to serve a public web site (such as an e-commerce web site), as well as provide services used internally by an entity that maintains the web services platform (e.g., document management systems or databases that identify the employees of the entity for human resource purposes).

Within this networking environment, TCP performance auditor 116 may determine initial values for TCP parameters for computing nodes to use in communicating with each other. It may be that these initial values are calculated for computing nodes within the web services platform, and not for external customer computers 102A and 102B. This may be because adjusting default TCP parameters is appropriate when using communications within the intranet of the web services platform, because optimal values are likely to differ from default values, but not for communications that travel across the Internet, where beginning with the default values for TCP parameters is likely to result in satisfactory performance.

Each computing node may have a TCP stack that is "aware" of hints of values for TCP parameters—that is, the TCP has been modified or created to use values of TCP parameters indicated by TCP performance auditor. For example, a computing node may store hints in a route table (such as route table 200 of FIG. 2) that the TCP stack uses to direct network traffic to other computing nodes. In other embodiments, a computing node may store hints in a data structure that is similar to a route table, but is not the route table that the TCP stack uses to direct network traffic. By using a data structure similar to a route table to store hints, the capability of a TCP stack to perform a longest-prefix match on a network address may be leveraged to quickly access these hints. In yet other embodiments, a computing node may store hints in a routing cache (sometimes referred to as a destination cache, or a DST cache in versions of a LINUX operating system) that is independent of the route table, and that caches routing decisions for traffic flow.

TCP performance auditor 116 may calculate these hints, or starting values for TCP parameters based on, for example, a latency associated with sending data between two computing nodes, a maximum throughput of data sent between the two computing nodes, or a hardware or software configuration of the computing nodes. In embodiments, TCP performance auditor 116 may determine the latency, throughput, or configuration empirically; determine this information based on modeling a network on which the two computing nodes communicate; or determine this information based on TCP parameters that have been determined for similarly situated computing nodes, or nodes that share a commonality (e.g., for a computing node on the same hardware rack that is connected to the same switch).

In embodiments, hints may be provided to instances and/or host computers. In other embodiments, hints are provided only to host computers, which then use those hints when transmitting network traffic on behalf of the instances they host (since the instances will generally attempt to transmit TCP data via a virtualized TCP stack, and this data is eventually transmitted through a TCP stack of the host computer).

It may be appreciated that the system architecture of FIG. 1 provides an example of embodiments, and that there are other embodiments that may implement the present techniques. For example, functions of TCP performance auditor 116 may be performed in a decentralized manner among a plurality of computing nodes, rather than in the centralized manner depicted in FIG. 1. Additionally, functions of TCP performance auditor 116 may be performed within host computer 110 itself, both for hints for host computer 110 and the instances it supports (VM instances 114A and 114B), and also possibly for other computing nodes, such as those connected to network infrastructure 108.

FIG. 2 depicts an example route table containing TCP parameters that may be used by computing nodes in the example operating environment of FIG. 1 when implementing embodiments. In embodiments, route table 200 may be stored by, and used by, VM instance 114A, VM instance 114B, or host partition 112 of FIG. 1 in the process of establishing TCP connections and transmitting data across those connections. One of these computing nodes may use hint 220 to determine TCP parameters for a TCP connection established with corresponding destination 202. As used herein, a hint may identify a value for one or more TCP parameters to be used from the start of a given TCP session (e.g., a value of a parameter that is conveyed when sending a SYN packet to initiate establishing a TCP connection, or a value of a parameter that the destination computing node may use in transmitting the first—and subsequent—data packets, like round trip time (RTT)).

As depicted, route table 200 contains four columns—destination 202, network mask 204, gateway 206, interface 208, and hints 220. Each row of route table uses information stored in these columns to route data in TCP connections (using destination 202, network mask 204, gateway 206, and interface 208), and additionally to set parameters for such a TCP connection (using hints 220). (Route table 200 also contains six rows—rows 212, 214, 216, 218, 220 and 222.) Destination 202 identifies destinations for TCP traffic. In destination 202, longest-prefix matching is used. For example, if no other prefix matches, the rule for row 212 with destination 0.0.0.0 is used. However, if the destination is address 192.168.2.2, the information in row 222 is used, because that completely matches the prefix in that row. If the destination is address 192.168.2.3, then the information in row 218 is used, because 192.168.2.0 is the longest matched prefix to 192.168.2.3 in route table 200.

In performing longest-prefix matching, information in network mask 204 is used. The network mask identifies the subset mask that is applied to the destination when performing longest-prefix matching. For example, a network mast of 0.0.0.0 (as in row 212) requires that no bits match, and a network mask of 255.255.255.0 (as in rows 218-222) requires that the leftmost 24 bits match (when expressing the numbers in binary).

Gateway 206 contains information on where data destined for a particular destination 202 should be initially sent. For example, row 222 identifies the destination as 192.168.2.2 and the gateway as 192.168.0.1, so when sending data destined for 192.168.2.2 according to route table 200, that data is initially sent to 192.168.0.1 (which will then send it along to 192.168.2.2—perhaps via one or more intermediary routers or network devices).

Interface 208 identifies the network interface of the computer that will transmit the data. For example, a computer may have multiple wired network connections active at the same time, which connect it to different networks. Interface 208 then indicates which connection is used for a particular destination. Here, there are two interfaces identified—loopback for traffic that is sent to the same computer that originates it and NIC (network interface card) for all traffic that is destined for some other computer.

Hints 220 provides information on how to set TCP parameters for a corresponding network connection. As depicted, the two hints are NEAR and FAR, though it may be appreciated that there are other hints. NEAR and FAR here may be used to signify a latency associated with sending network traffic to a destination, rather than a physical proximity (for example, a computing node may be very close, but be connected via a slow connection, or the computing node may be very close, but the physical connection with that computing node may be extremely long—such as a fallback connection in a ring topography where the more direct connection fails). These hints may be used to adjust TCP parameters before a connection is established. For example, a NEAR hint may indicate using a larger initial maximum segment size (MSS) than a FAR hint (since it may be less likely that there will be collisions with other packets while a packet is in transmission), or a setting for a maximum number of timeouts or round-trip time may be lower with a NEAR hint than with a FAR hint (since it is more likely that the destination computing node will respond in a relatively short amount of time).

Figure 3:
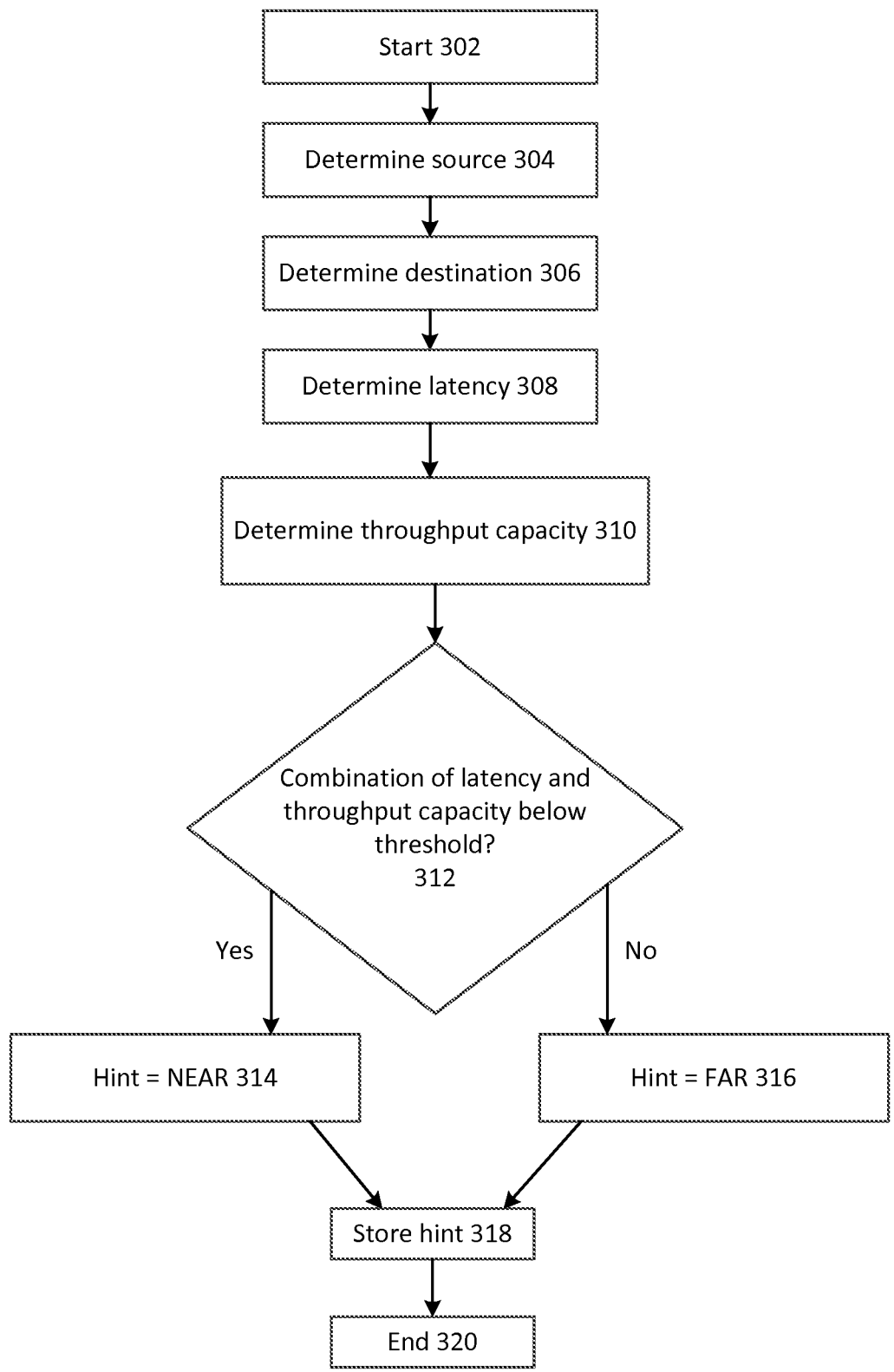
FIG. 3 depicts example operating procedures for determining TCP parameters for two computing nodes.

FIG. 3 depicts example operating procedures for determining TCP parameters for two computing nodes. In embodiments, the operating procedures of FIG. 3 may be implemented by TCP performance auditor 116 to determine TCP parameters for VM instance 114A or 114B, or more generally, host computer 110, when communicating with another computing node, such as a computing node in production network 120.

The operating procedures of FIG. 3 begin with operation 302 and then move to operation 304. Operation 304 depicts determining the source computing node. In embodiments, TCP performance auditor 116 may maintain a list of computing nodes for which TCP parameters are to be determined. In such a scenario, operation 304 may comprise selecting a computing node from this list, for which the operating procedures of FIG. 3 have not been performed within a given amount of time. In such a scenario, TCP performance auditor 116 may also receive indications of computing nodes that are newly added or that are no longer present, impaired or otherwise unable to perform TCP communications. TCP performance auditor 116 may receive these indications from, for instance, a component of the network that tracks the presence of computing nodes, such as an instance manager or a load balancer, and use these indications to add computing nodes to, or remove computing nodes from, this list.

In other embodiments, operation 302 may comprise receiving user input indicative of the source computing node, such as where an administrator or a customer wants to determine TCP parameters for a specific source computing node. After operation 304, the operating procedures of FIG. 3 move to operation 306.

Operation 306 depicts determining a destination computing node. Where TCP performance auditor 116 maintains a list as described with respect to operation 302, this may comprise selecting another computing node from the list as the destination computing node (including, possibly selecting the same computing node as both the source and destination computing nodes, where TCP parameters for a loopback connection are to be determined). Operation 306 may also comprise receiving user input indicative of the destination computing node, such as where an administrator wants to determine TCP parameters for a specific source computing node.

In embodiments, each permutation of pairs of computing nodes (to be the source and destination computing nodes)

may be evaluated using the operating procedures of FIG. 3. Doing so would determine TCP parameters for each possible TCP connection in the network. In other embodiments, the operating procedures of FIG. 3 may be performed for a subset of the possible pairs of computing nodes in the network.

In additional embodiments, the operating procedures of FIG. 3 may be performed for a subset of the possible pairs of computing nodes in the network, and those determined parameters may be used for computing nodes for which parameters were not determined. For example, each computing node in a physical rack may be similarly situated—it may have a similar hardware and software configuration, and a similar network connection (e.g., a 10 gigabyte/second connection using a cable of substantially similar length to the same top-of-rack switch). In such cases, it may be that it is likely that the TCP parameters for each of these computing nodes will be the same, and it may be possible to determine parameters for all of these computing nodes by calculating them for a representative single one of the computing nodes. In other embodiments, it may be that similarly situated computing nodes have similar IP address prefixes (e.g., all computing nodes with an IP address prefix of 192.168.3.x are similarly situated), and a subset or representative computing node may be selected based on its IP address. After operation 306, the operating procedures of FIG. 3 move to operation 308.

Operation 308 depicts determining a latency of network communications between the source computing node and the destination computing node. In embodiments, this may comprise the source computing node sending one or more ping requests to the destination computing node, and measuring the amount of time that it takes for a response from the destination computing node to reach the source computing node. Where multiple ping requests are sent, the results of these requests may be aggregated via a variety of statistical methods, such as calculating a mean or median, or a range, such as a median combined with a standard deviation. After operation 308, the operating procedures of FIG. 3 move to operation 310.

Operation 310 depicts determining a throughput capacity of network communications between the source computing node and the destination computing node. This throughput capacity may represent a maximum rate of data transfer between the two computing nodes given the bandwidth of the network fabric that connects the two computing nodes, and a latency associated with transmitting data between the two computing nodes. In embodiments, an indication of the maximum rate of data transfer may be stored by TCP performance auditor 116 (such as in a model of the network, as described with respect to operation 508 of FIG. 5), or by actually transmitting data between the source computing node and the destination computing node to determine experimentally what this rate is. After operation 310, the operating procedures of FIG. 3 move to operation 312.

The latency and throughput capacity discussed in operations 308 and 310 may be specific examples of characteristics of a network link—a network link comprising at least a portion of a network used to transmit data between the source computing node and the destination computing node. It may be appreciated that there are embodiments where other characteristics of the network link are used in operation 312 (described below). Additionally, it may be appreciated that there are embodiments where operation 312 is based on latency but not throughput capacity (or vice versa). For example, rather than empirically determining the throughput capacity, it may be determined that a network has such great throughput capacity that only latency will be used to determine TCP parameters, as discussed below.

Operation 312 depicts determining whether the combination of latency (determined in operation 308) and throughput capacity (determined in operation 310) is below a threshold, or predetermined value. This may generally indicate whether communications between the two computing nodes are relatively slow or are relatively fast. This result may affect how TCP parameters are set for communications between the two computing nodes. For example, when the communications are relatively fast, a window size for packets may be set higher than when the communications are relatively slow.

In other embodiments, the relative speed may be determined in a more fine-grained manner (e.g., very slow, slow, medium, fast, very fast) or other aspects of the characteristics of the connection may be determined, such as how reliably packets are transmitted via the connection. Where it is determined that the combination of latency and throughput capacity is below the predetermined value, the operating procedures of FIG. 3 move to operation 314. Instead, where it is determined that the combination of latency and throughput capacity is not below the predetermined value, the operating procedures of FIG. 3 move to operation 316.

Operation 314 depicts determining that the hint will indicate that the two computing nodes are NEAR (as described with reference to FIG. 2). As used herein, a hint may indicate one or more TCP parameters to use in a given TCP connection. A hint may directly comprise an indication that the two nodes are NEAR, which may then be translated to corresponding TCP parameters (such as window size) or a hint that indicates that there is low latency may directly specify values for certain TCP parameters. After operation 314, the operating procedures of FIG. 3 move to operation 318.

Operation 316 depicts determining that the hint will indicate that the two computing nodes are FAR (as described with reference to FIG. 2). Operation 316 may be implemented in a similar manner as operation 314, save for an indication that the two nodes are FAR or an indication of different values for TCP parameters that correspond to high latency, instead of those for low latency as in operation 314. After operation 316, the operating procedures of FIG. 3 move to operation 318.

Operation 318 depicts storing the hint. The hint as described in operations 314-316 may be stored by TCP performance auditor 116 in local memory or storage, or in another memory or storage location within the network. This storage location may be accessible to computing nodes (such as object-level storage 118), such that computing nodes may access this storage location periodically and retrieve the hint (which, they may then store, for example, in route table 200, where a route table embodiment is used for hints). In other embodiments, TCP performance auditor 116 may send an indication of a hint to a computing node, which may have an agent process executing on it that receives the hint and stores it in an appropriate location (such as route table 200 or a portion of a VM instance, where, using the example of FIG. 1, the agent executes on host partition 112 rather than in VM instance 114A or 114B). In other embodiments, a kernel module of the computing node may be created or modified, which exposes an interface that TCP performance auditor 116 may use to send information about the hint to the computing node.

Referring specifically to embodiments involving VM instances (such as VM instances 114A and 114B hosted by host computer 110 of FIG. 1), there may be embodiments where a guest OS offloads functions of a TCP stack to the host computer. For instance, host computer 110 may provide a virtualized network interface card (NIC) with a TCP offload engine (TOE) to VM instances 114A and 114B. A TOE may be implemented in a NIC to offload processing of some, or all, or a TCP stack from an operating system (such as a guest operating system of a VM instance) to the NIC that implements TOE. In such embodiments, presenting a virtual NIC with TOE to a VM instance may serve as a technique to facilitate the host computer processing hints on behalf a VM instance that has not been modified to process hints (since much of the TCP processing may be offloaded to the host computer via the virtual NIC with TOE).

These various embodiments may generally be referred to as making an indication of the value of the parameter available to the computing node. After operation 318, the operating procedures of FIG. 3 move to operation 320, where the operating procedures of FIG. 3 end.

Figure 4:
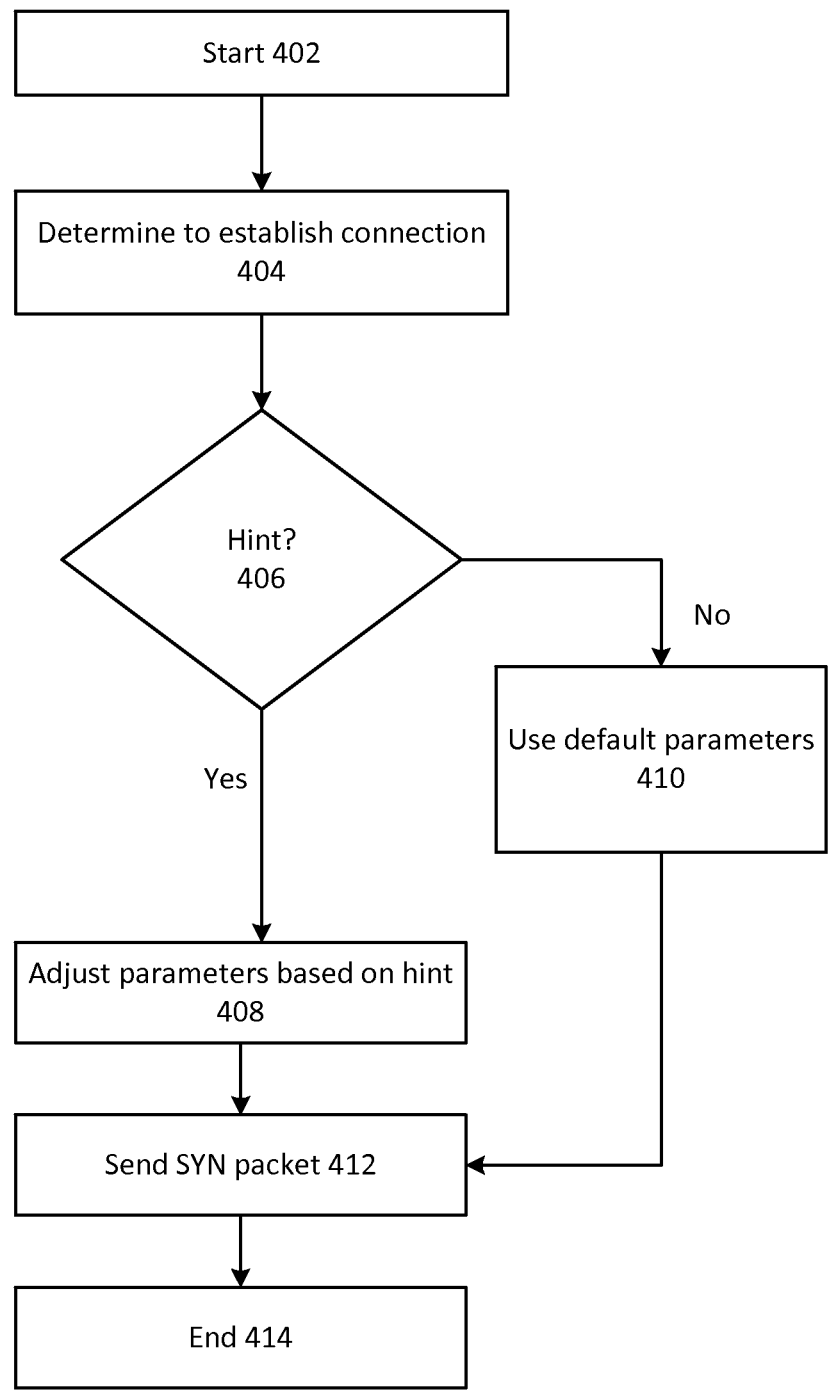
FIG. 4 depicts example operating procedures for a computing node using pre-determined TCP parameters.

FIG. 4 depicts example operating procedures for a computing node using pre-determined TCP parameters. In embodiments, the operating procedures of FIG. 4 may be implemented by VM instance 114A or 114B or host computer 110, when communicating with another computing node, such as a computing node in production network 120. The operating procedures of FIG. 4 begin with operation 402, and then move to operation 404.

Operation 404 depicts determining to establish a TCP connection with another computing node. This may occur, for example, in response to a user process on a computing node attempting to send a network communication to another computing node, such as to send an email or request a web page. After operation 404, the operating procedures of FIG. 4 move to operation 406.

Operation 406 depicts determining whether there is a hint associated with the other computing node. Where a computing node stores hints in a route table such as route table 200 of FIG. 2, this may comprise determining whether there is an entry in the hint column 220 that corresponds to the appropriate entry for the other computing node in the destination column 202 of route table 200. Where it is determined that there is a hint associated with the other computing node, the operating procedures of FIG. 4 move to operation 408. However, where it is determined that there is not a hint associated with the other computing node, the operating procedures of FIG. 4 move to operation 410.

Operation 408 depicts adjusting parameters for the TCP session with the other computing node based on the hint. For example, the hint may indicate that the TCP session should begin with a particular window size, round trip time (RTT) value or number of timeouts value. In embodiments where it is determined that cryptographic tunneling will be used, the hint may involve reducing the maximum segment size (MSS) as opposed to where no tunneling will be used, because information used in tunneling will occupy space in a packet, leaving less space for the packet's data payload. After operation 408, the operating procedures of FIG. 4 move to operation 412.

Where in operation 406 it is determined that there is not a hint associated with the other computing node, instead of moving to operation 408, the operating procedures of FIG. 4 move to operation 410. Operation 410 depicts using default parameters for the TCP session with the other computing node. In embodiments, default parameters may be used in the absence of setting new values for those parameters based on hints. In such a case, operation 410 may comprise omitting assigning any new values for parameters based on hints. After operation 410, the operating procedures of FIG. 4 move to operation 412.

Operation 412 depicts sending a SYN packet to the other computing node. A SYN packet may be the initial packet sent in establishing a TCP connection (followed by receiving a SYN-ACK packet from that other computing node, and then sending an ACK packet to that other computing node; when that other computing node processes the ACK packet, the TCP connection is established). This SYN packet may indicate one or more TCP parameters to use in the session, which may be a combination of default parameter values, and values set in response to one or more hints. The SYN packet may indicate, for example, a maximum segment size, or a window scale.

Where a SYN packet does not specify a particular TCP parameter, it may be that the source computing node may implement that parameter unilaterally. For example, a source computing node may not indicate in a SYN packet what the RTT value is, but may implement it by re-sending a packet should that RTT be reached for a given packet. In this manner, the destination computing node need not be informed of what the RTT value is for the TCP connection since only the source computing node will perform operations based on the RTT value.

Operation 412 may lead to establishing a TCP connection in which the TCP parameter values specified by a hint (if a hint is known for the present connection) are used. After that, data may be transmitted between the two computing nodes based on those values for TCP parameters. While the values for parameters in a TCP connection may vary over time, it may be that the initial data packet sent in the TCP connection will be sent according to the value for a parameter that is specified by the hint. After operation 412, the operating procedures of FIG. 4 move to operation 414, where the operating procedures of FIG. 4 end.

Figure 5:
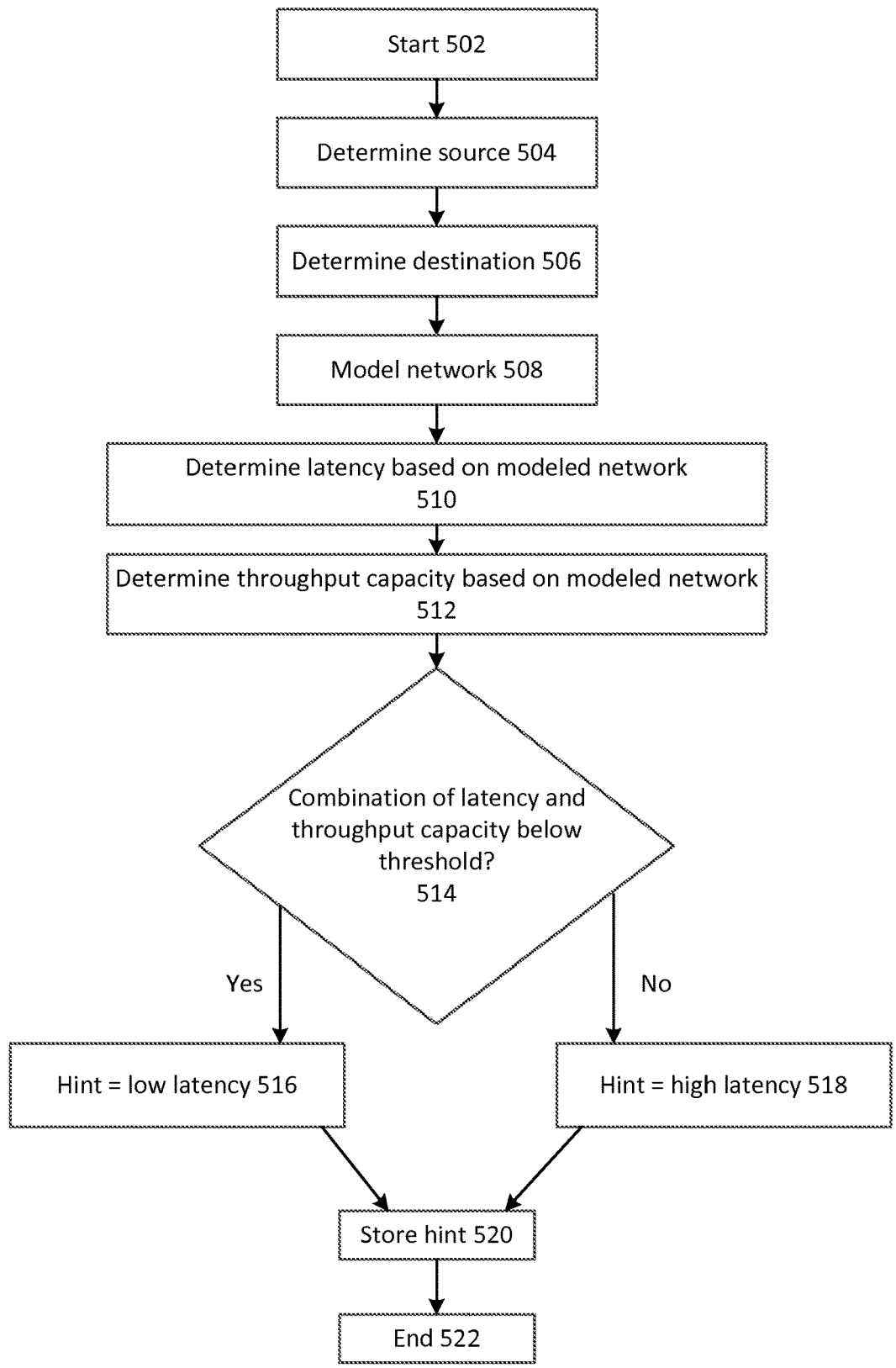
FIG. 5 depicts example operating procedures for determining TCP parameters for two computing nodes based on modeling a network.

FIG. 5 depicts example operating procedures for determining TCP parameters for two computing nodes based on modeling a network. In embodiments, the operating procedures of FIG. 5 may be implemented by TCP performance auditor 116 to determine TCP parameters for VM instance 114A or 114B or more generally, host computer 110, when communicating with another computing node, such as a computing node in production network 120.

The operating procedures of FIG. 5 begin with operation 502 and then move to operation 504. Operation 504 depicts determining the source computing node. In embodiments, operation 504 may be implemented in a similar manner as operation 304 of FIG. 3. After operation 504, the operating procedures of FIG. 5 move to operation 506.

Operation 506 depicts determining a destination computing node. In embodiments, operation 506 may be implemented in a similar manner as operation 306 of FIG. 3. After operation 506, the operating procedures of FIG. 5 move to operation 508.

Operation 508 depicts modeling a network that connects the source computing node of operation 504 and the destination computing node of operation 506. In embodiments, this may comprise TCP performance auditor 116 maintaining a data structure or other data store that represents latency and maximum throughput for connections between computing nodes and characteristics of the computing nodes themselves (such as hardware or software type, or physical location). After operation 508, the operating procedures of FIG. 5 move to operation 510.

Operation 510 depicts determining a latency of network communications between the source computing node and the destination computing node on the modeled network of operation 508. This may comprise determining which network connection is used to carry traffic across the network fabric between the two computing nodes. There may be multiple such connections or routes between the two computing nodes. In some embodiments, multiple or all of these possible routes may be considered. In other embodiments, the route with the lowest associated latency may be considered. After operation 510, the operating procedures of FIG. 5 move to operation 512.

Operation 512 depicts determining a throughput capacity of network communications between the source computing node and the destination computing node on the modeled network. In embodiments, this may comprise determining a throughput capacity of the route selected in operation 510, where there are multiple possible routes and one route is selected. In other embodiments, operations 510 and 512 may be performed in conjunction, where there are multiple routes to consider and the determined route (with its associated latency and throughput capacity) is determined based on the route with the highest actual throughput, given its latency and throughput capacity. After operation 512, the operating procedures of FIG. 5 move to operation 514.

Operation 514 depicts determining whether the combination of latency (determined in operation 510) and throughput capacity (determined in operation 512) is below a threshold or predetermined value. In embodiments, operation 514 may be implemented in a similar manner as operation 312 of FIG. 3. Where it is determined that the combination of latency and throughput capacity is below the predetermined value, the operating procedures of FIG. 5 move to operation 516. Instead, where it is determined that the combination of latency and throughput capacity is not below the predetermined value, the operating procedures of FIG. 5 move to operation 518.

Operation 516 depicts determining that the hint will indicate that there is low latency between the two computing nodes. In embodiments, operation 516 may be implemented in a similar manner as operation 314 of FIG. 3. After operation 516, the operating procedures of FIG. 5 move to operation 520.

Operation 518 depicts determining that the hint will indicate that there is high latency between the two computing nodes. In embodiments, operation 518 may be implemented in a similar manner as operation 316 of FIG. 3. After operation 518, the operating procedures of FIG. 5 move to operation 520.

Operation 520 depicts storing the hint. In embodiments, operation 520 may be implemented in a similar manner as operation 318 of FIG. 3. After operation 520, the operating procedures of FIG. 5 move to operation 522, where the operating procedures of FIG. 5 end.

Figure 6:
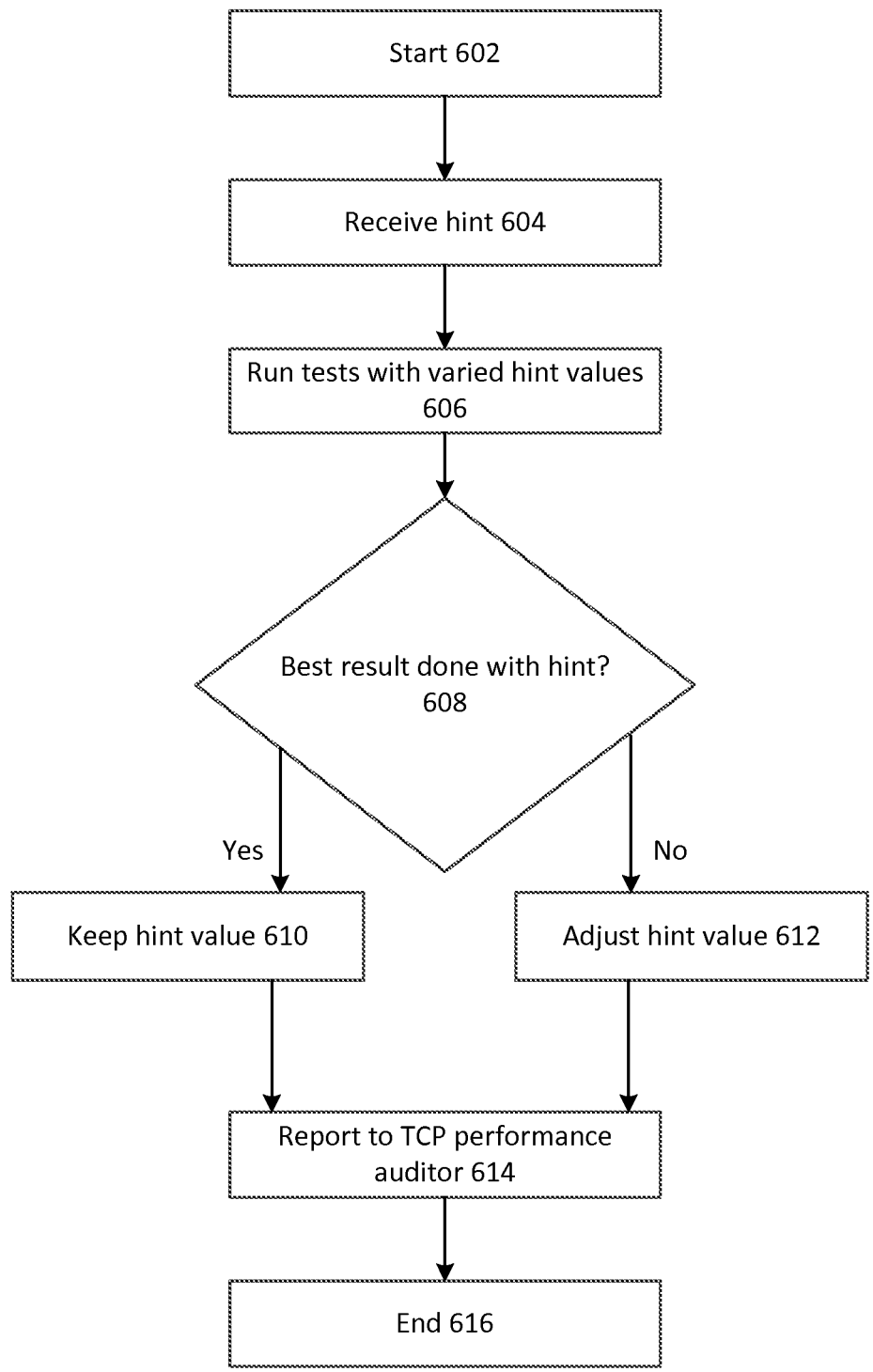
FIG. 6 depicts example operating procedures for a computing node to fine-tune predetermined TCP parameters.

FIG. 6 depicts example operating procedures for a computing node to fine-tune predetermined TCP parameters. In embodiments, the operating procedures of FIG. 3 may be implemented by VM instance 114A or 114B or, more generally, host computer 110 when communicating with another computing node, such as a computing node in production network 120.

The operating procedures of FIG. 6 begin with operation 602, and then move to operation 604. Operation 604 depicts receiving a hint. In embodiments, the hint may be received from TCP performance auditor 116 via an agent process executing on the computing node that implements the operations of FIG. 6. In other embodiments, an agent process may periodically access a data store of hints across a network and retrieve the hint or hints relative to the computing node that implements the operations of FIG. 6. After operation 604, the operating procedures of FIG. 6 move to operation 606.

Operation 606 depicts running tests while varying the value or values received in the hint. Put another way, the tests may be run with various values for the parameter. The values may be varied based on the hint. For example, in the tests the hint value may be increased or decreased by up to 10%. For example, the hint may specify a RTT of 100 ms to be used for a TCP connection with a given computing node. The computing node may conduct tests by communicating with the given computing node using a RTT value of 100 ms, but also varying it to be greater or less (for instance, from 90 ms to 110 ms). These tests may comprise determining how much data can be transmitted in a given amount of time when a particular RTT value is used. After operation 606, the operating procedures of FIG. 6 move to operation 608.

Operation 608 depicts determining whether the best result from the tests of operation 606 was achieved with the value or values indicated by the hint. This may be the case where the amount of data that was transmitted in a given amount of time when using the value for a TCP parameter specified in the hint is less than the amount of data that was transmitted in the given amount of time when using a different value for that TCP parameter. For example, it may be that the hint indicates using a RTT of 100 ms, but it may be that a higher transfer rate is accomplished when using a RTT of 95 ms than a RTT of 100 ms. Where the best result from the tests of operation 606 was achieved with the value or values indicated by the hint, the operating procedures of FIG. 6 move to operation 610. However, where the best result from the tests of operation 606 was not achieved with the value or values indicated by the hint, the operating procedures of FIG. 6 move to operation 612.

Operation 610 depicts keeping the value for the parameter indicated by the hint. In embodiments, this may comprise determining not to modify the corresponding entry for the hint in route table 200 of FIG. 2. After operation 610, the operating procedures of FIG. 6 move to operation 614.

Where in operation 608 it is determined that the best result from the tests of operation 606 was not achieved with the value or values indicated by the hint, instead of moving to operation 610, the operating procedures of FIG. 6 move to operation 612. Operation 612 depicts adjusting the value for the parameter indicated by the hint. In embodiments, this may comprise adjusting an appropriate entry for the hint in route table 200 of FIG. 2 to reflect the value that was used to achieve the best result in the tests. After operation 612, the operating procedures of FIG. 6 move to operation 614.

Operation 614 depicts reporting the network performance of the tests in operation 606 to a TCP performance auditor. In embodiments, this may comprise directly sending TCP performance auditor 116 information about the performance of the tests or storing information about the performance of the tests in a location accessible to TCP performance auditor 116 (such as in object-level storage 118), which may later retrieve the information from that location. In embodiments, this may comprise sending TCP performance auditor information about the computing node itself (such as software and hardware configuration), along with the test information. The test information sent may be information about the best result or information about all of the tests run, such as the value of the TCP parameter used, a resulting transfer rate achieved and a time at which the test was run. After operation 614, the operating procedures of FIG. 6 move to operation 616, where the operating procedures of FIG. 6 end.

Figure 7:
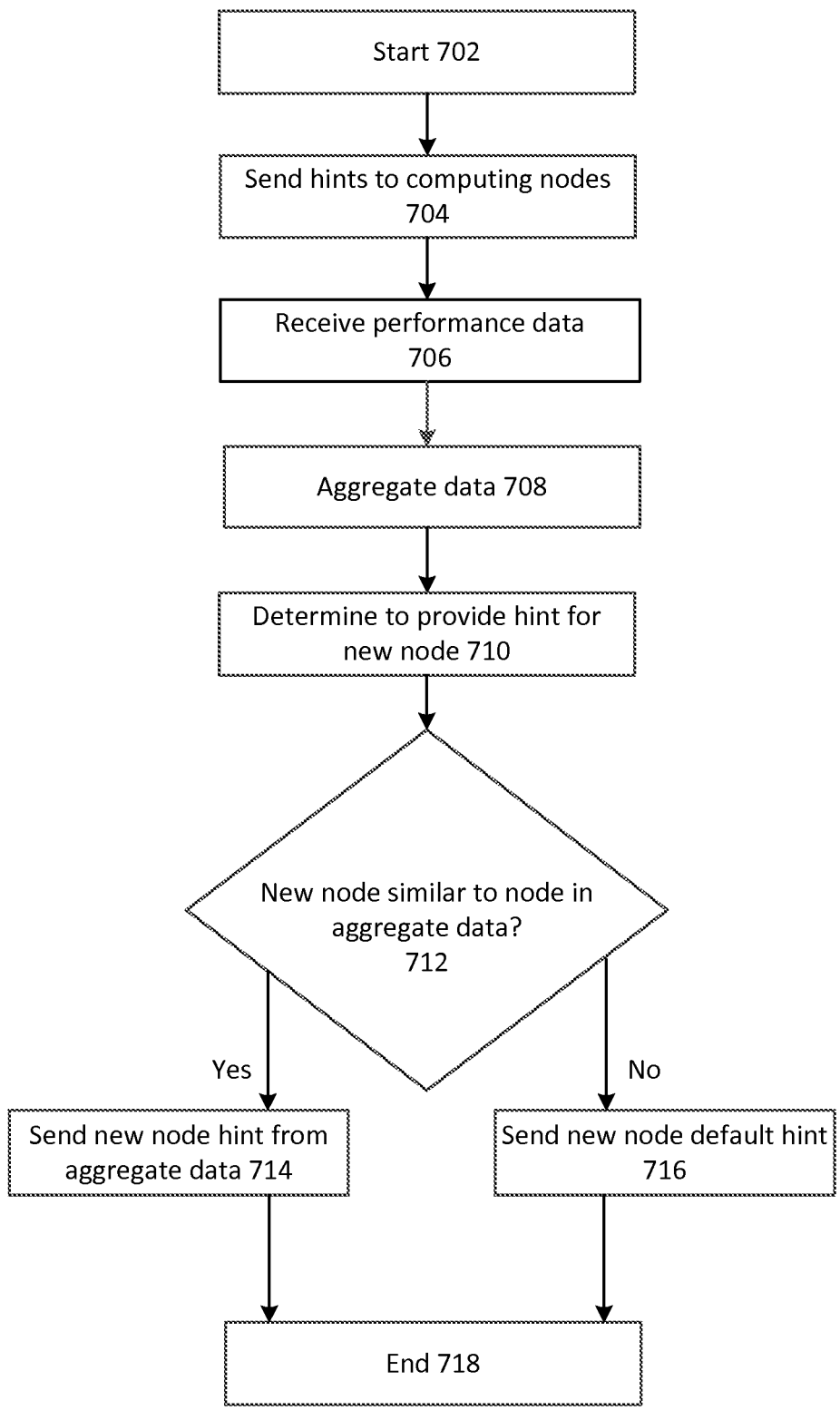
FIG. 7 depicts example operating procedures for aggregating fine-tuned TCP parameters from multiple computing nodes that implement the operating procedures of FIG. 6, and using the aggregated TCP parameters to pre-determine TCP parameters for another computing node.

FIG. 7 depicts example operating procedures for aggregating fine-tuned TCP parameters from multiple computing nodes that implement the operating procedures of FIG. 6, and using the aggregated TCP parameters to pre-determine TCP parameters for another computing node. In embodiments, the operating procedures of FIG. 3 may be implemented by TCP performance auditor 116 to determine TCP parameters for VM instance 114A or 114B or more generally, host computer 110 when communicating with another computing node, such as a computing node in production network 120.

The operating procedures of FIG. 7 begin with operation 702 and move to operation 704. Operation 704 depicts sending a hint to one or more computing nodes. This may comprise TCP performance auditor sending the hint to an agent process that executes on each of the one or more computing nodes. In other embodiments, TCP performance auditor may store hints in a publicly accessible location, and an agent process on each of the computing nodes may periodically retrieve relevant hints from that publicly accessible location. After operation 704, the operating procedures of FIG. 7 move to operation 706.

Operation 706 depicts receiving performance data for computing nodes. This may be the performance data generated by a computing node in operation 614 of FIG. 6 for one or more computing nodes. After operation 706, the operating procedures of FIG. 7 move to operation 708.

Operation 708 depicts aggregating the data received in operation 706. Aggregating the data may be performed by grouping the performance data of similarly situated computing nodes together (e.g., those having one or more of a similar hardware configuration, a similar software location, a similar physical location or being directly connected to the same network switch or routing device). For example, this grouping of similarly situated computing nodes may be based on the source computing nodes alone, or a combination of the source computing nodes and the destination computing nodes (e.g., where the source computing nodes are similarly situated with each other and the destination computing nodes are also similarly situated with each other).

The act of aggregating this data may comprise aggregating the data into a histogram, distribution or other set of values, and determining from that aggregated data one or more of a variety of statistical operations—e.g., calculating a mean or a median, optionally along with a corresponding standard deviation. After operation 708, the operating procedures of FIG. 7 move to operation 710.

Operation 710 depicts determining to provide a hint for a new computing node. For example, a new computing node may be added to the network, such as an instance that has been spun up or a physical computing node that has been installed on the network. In response to this happening, TCP performance auditor may receive an indication that the new computing node has been added—such as from a load balancer that tracks the presence and availability of computing nodes on the network, an instance manager that monitors the presence and availability of instances on the network or from user input received from an administrator that indicates the presence of the new computing node.

In response to determining that this new computing node exists, TCP performance auditor may determine whether a hint for the computing node already exists. It may be that this computing node was previously part of the network, and TCP performance auditor already determined a hint for it. Then, the computing node may be taken offline, such as for maintenance. When the computing node is brought back online, TCP performance auditor may receive an indication that is newly added, even though TCP performance auditor 116 already has determined a hint for it. Where TCP performance auditor 116 already has a hint for the computing node, TCP performance auditor may determine that it is not necessary to provide a new hint for the computing node.

In other embodiments, TCP performance auditor may determine that, even though there is already a hint for the computing node, a new hint should be determined. This may be where the characteristics of the computing node have changed. For instance, where the computing node was taken offline for maintenance, an administrator may have altered its software configuration, or put a new NIC (network interface card) in the computing node. This change may cause the computing node to be different enough from before that TCP performance auditor may determine to calculate a new hint. TCP performance auditor may make this determination where it is sent information about the hardware and/or software configuration of the computing node, such as from an agent process that executes on the computing node. TCP performance auditor may have stored previous information about the configuration of the computing node and compare this new information against the previous information. After operation 710, the operating procedures of FIG. 7 move to operation 712.

Operation 712 depicts determining whether the new computing node of operation 710 is similar to a node contained within the aggregated data of operation 708. So, in lieu of performing tests on the new computing node itself to determine a hint, TCP performance auditor 116 may determine that the new computing node should receive the same (or similar) hint as another, similarly-situated computing node. For example, TCP performance auditor 116 may determine that the new computing node and another computing node that is represented in the aggregated data are both located in the same physical rack, or are both instances hosted on the same physical computing node. In other embodiments, this may comprise determining that the two computing nodes share a similar hardware or software configuration. Where the new computing node is similar to a node contained within the aggregated data of operation 708, the operating procedures of FIG. 7 move to operation 714. However, where the new computing node is not similar to a node contained within the aggregated data of operation 708, the operating procedures of FIG. 7 move to operation 716.

Operation 714 depicts sending the new computing node a hint based on the aggregated data of operation 708. This may comprise sending the new computing node the same hint that has been determined for the similarly situated computing node. This may comprise sending an indication of the hint to an agent process executing on the computing node, or storing the hint in a publicly accessible location from which the agent process on the computing node may retrieve the hint. After operation 714, the operating procedures of FIG. 7 move to operation 718, where the operating procedures of FIG. 7 end.

Where in operation 712 it is determined the new computing node is similar to a node contained within the aggregated data of operation 708, instead of moving to operation 714, the operating procedures of FIG. 7 move to operation 716. Operation 716 depicts sending the new computing node a default hint. This default hint may comprise one or more values for one or more TCP parameters regardless of the specific characteristics of the computing node. For example, it may be that, by virtue of executing on the network, the computing node should have a relatively low value for RTT, because the network is fast. So, the default hint may not be based on a characteristic of the computing node itself (other than it is connected to a network for which hints are provided), but based on other characteristics that may apply to every computing node on the network (such as characteristics of the network itself).

In other embodiments, the computing node may already have the default hint as part of the process of provisioning the computing node to execute on the network, and operation 716 may be omitted. After operation 716, the operating procedures of FIG. 7 move to operation 718, where the operating procedures of FIG. 7 end.

Figure 8:
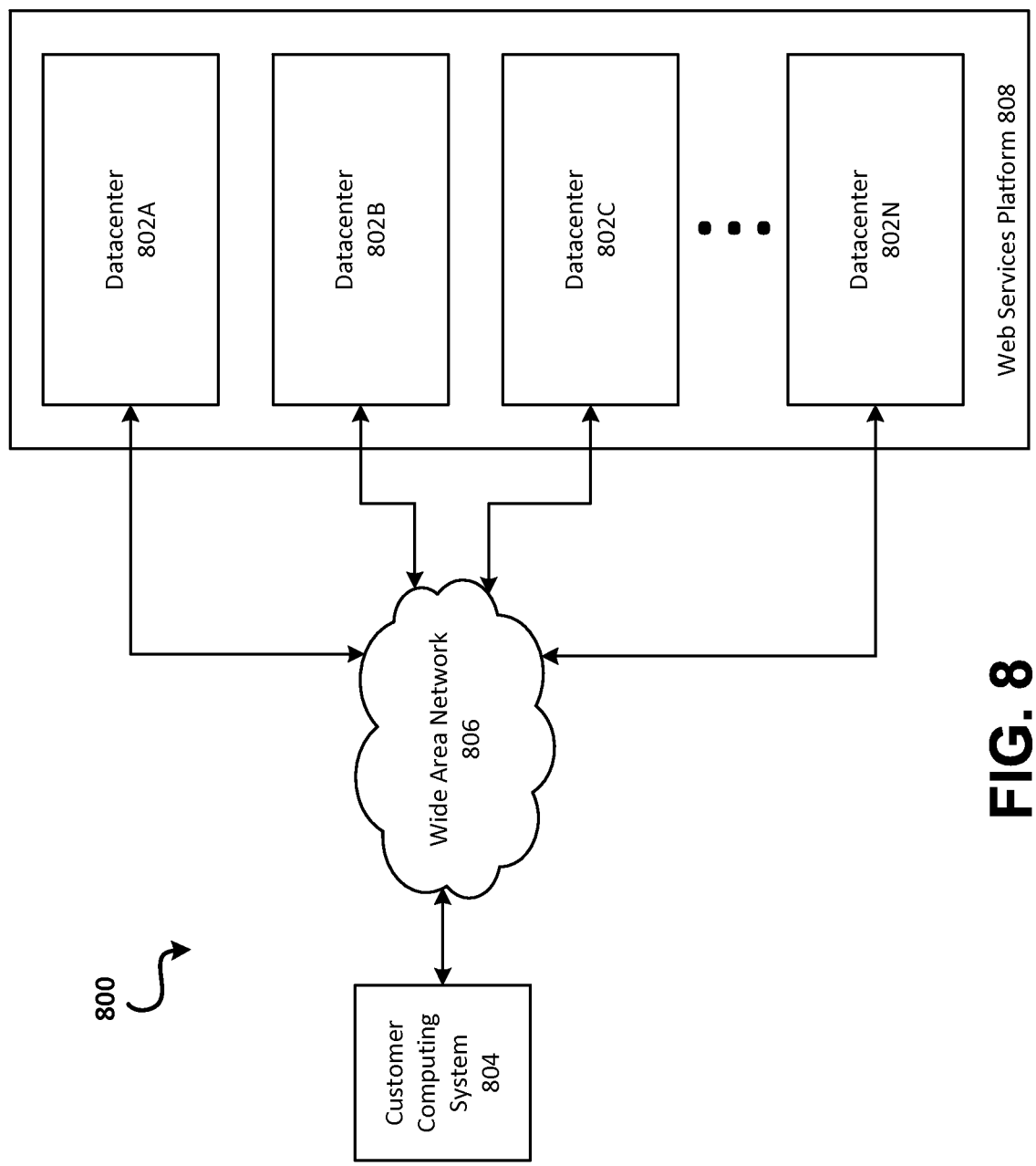
FIG. 8 depicts an example of a suitable computing environment in which embodiments described herein may be implemented.
Figure 9:
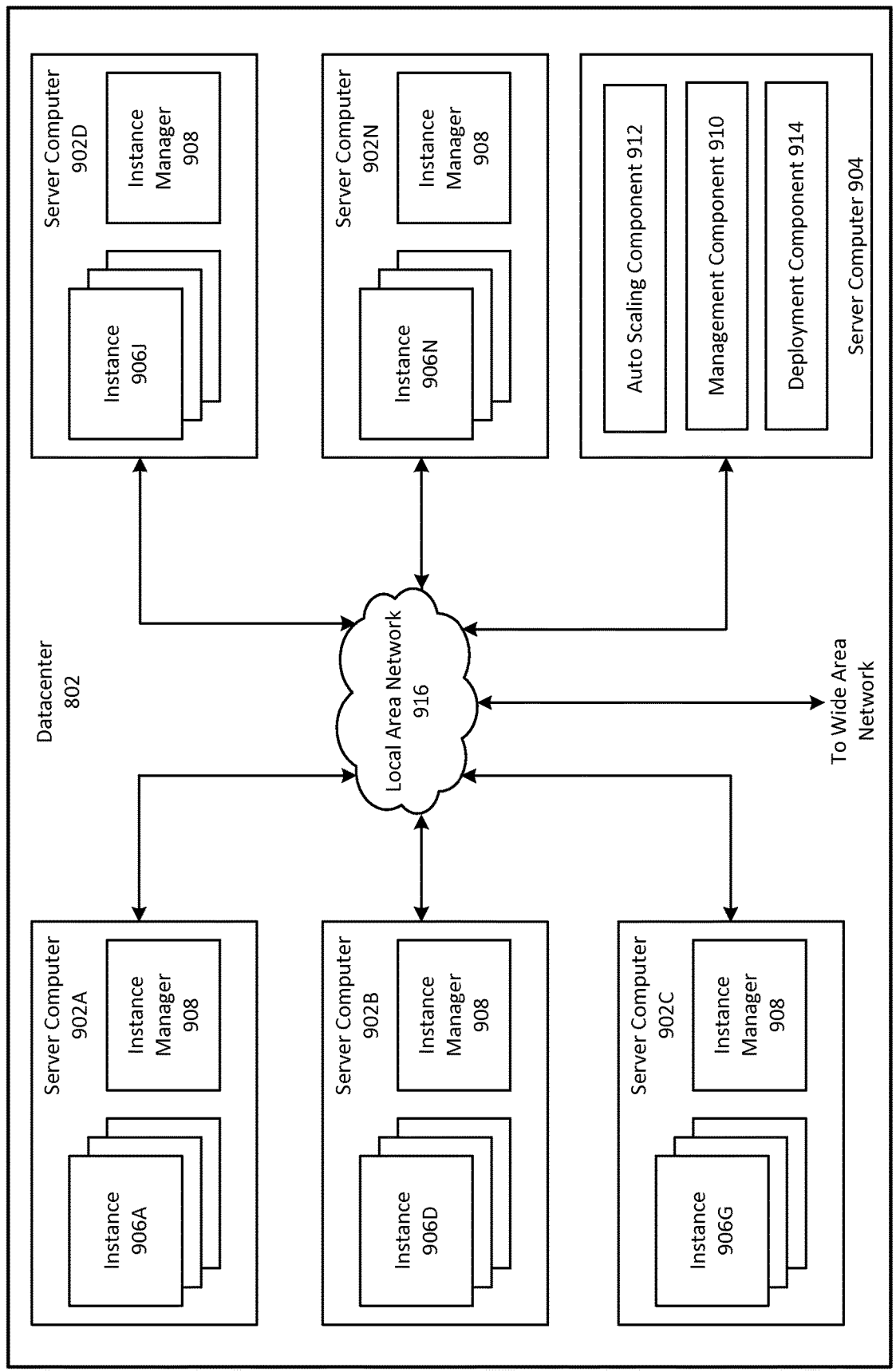
FIG. 9 depicts a computing system diagram that illustrates one configuration for datacenter that implements web services platform.
Figure 10:
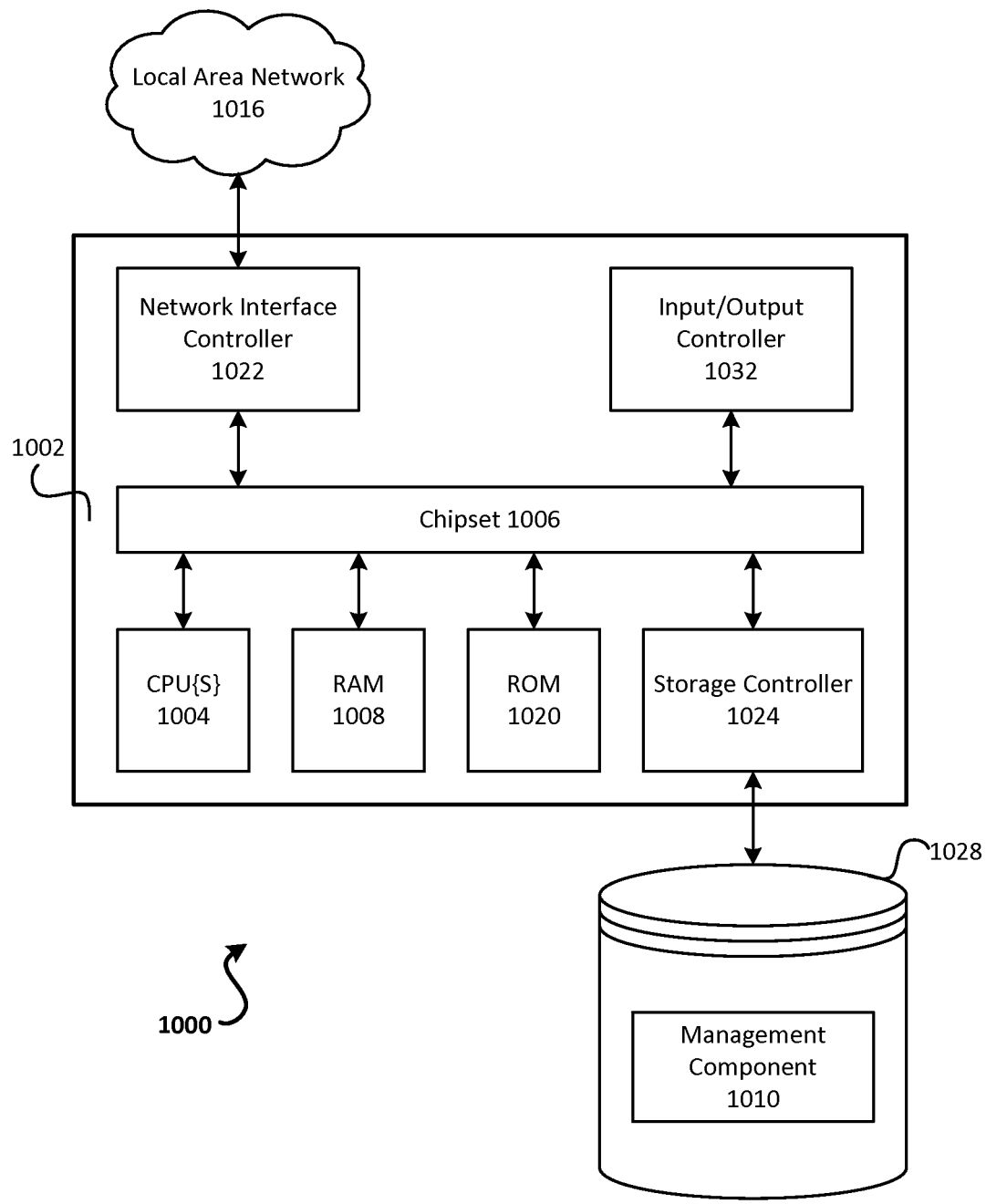
FIG. 10 depicts an example computer architecture for a computer capable of executing the above-described software components.

FIGS. 8-10 are similar to FIG. 1 in that they depict example operating environments in which embodiments disclosed herein may be implemented, and these figures depict these operating environments at varying levels of granularity. FIG. 8 generally depicts a web services platform that comprises a plurality of datacenters. FIG. 9 generally depicts a datacenter that comprises a plurality of computers. FIG. 10 generally depicts a computer that may be part of a datacenter.

It may be appreciated that these operating environments of FIGS. 8-10 may be used to implement aspects of the operating environment of FIG. 1. For example, edge device 106, host computer 110, and TCP performance auditor 116 may be implemented in a datacenter 802 of FIG. 8, or across multiple datacenters 802 of FIG. 8. Likewise, Internet 104 of FIG. 1 may be wide area network 806 of FIG. 8, and customer computer-A 102A and customer computer-B 102B each may be customer computing system 804 of FIG. 8.

Turning now to details of FIG. 8, that figure depicts an example of a suitable computing environment in which embodiments described herein may be implemented. A cloud service provider (such as web services platform 808) may configure the illustrated computing environment to host virtual clouds of entities and to enable communication paths between these virtual clouds that may otherwise be isolated. In particular, FIG. 8 is a system and network diagram that shows an illustrative operating environment 800 that includes a web services platform 808, for implementing virtual clouds and for providing on-demand access to compute resources, such as virtual machine instances. Web services platform 808 can provide compute resources for executing applications on a permanent or an as-needed basis and may be configured as a private network. These compute resources may include various types of resources, such as data processing resources, data storage resources, data communication resources and the like. Each type of compute resource may be general-purpose or may be available in a number of specific configurations. For example, data processing resources may be available as virtual machine instances. The instances may be configured to execute applications, including Web servers, application servers, media servers, database servers and the like. Data storage resources may include file storage devices, block storage devices and the like.

Each type or configuration of compute resource may be available in different sizes, such as large resources consisting of many processors, large amounts of memory and/or large storage capacity and small resources consisting of fewer processors, smaller amounts of memory and/or smaller storage capacity. Entities may choose to allocate a number of small processing resources as Web servers and/or one large processing resource as a database server, for example.

The compute resources provided by web services platform 808 may be enabled by one or more datacenters 802A-802N, which may be referred herein singularly as "datacenter 802" or in the plural as "datacenters 802."

Datacenters 802 may be facilities that house and operate computer systems and associated components and may include redundant and backup power, communications, cooling and security systems. Datacenters 802 may be located in a same geographical area, such as in a same facility, and may be interconnected using private networks, such as high-speed fiber optic networks, controlled and managed by a service provider of web services platform 808. Datacenters 802 may also be distributed across geographically disparate locations and may be interconnected in part using public networks, such as the Internet. One illustrative configuration for datacenter 802 that implements the concepts and technologies disclosed herein is described below with regard to FIG. 9.

Entities of web services platform 808 may access the compute resources provided by datacenters 802 over a wide-area network ("WAN") 806. Although a WAN is illustrated in FIG. 8, it should be appreciated that a local-area network ("LAN"), the Internet or any other networking topology known in the art that connects datacenters 802 to remote entities and other users may be utilized. It should also be appreciated that combinations of such networks may also be utilized.

An entity or other entities that are customers of web services platform 808 may utilize a computing system 804 to access the compute resources provided by datacenters 802. Customer computing system 804 comprises a computer capable of accessing web services platform 808, such as a server computer, a desktop or laptop personal computer, a tablet computer, a wireless telephone, a PDA, an e-reader, a game console, a set-top box or any other computing node.

As is described in greater detail below, customer computing system 804 may be utilized to configure aspects of the compute resources provided by web services platform 808. In this regard, web services platform 808 may provide a Web interface through which aspects of its operation may be configured through the use of a Web browser application program executing on customer computing system 804. Alternatively, a stand-alone application program executing on customer computing system 804 may access an application programming interface ("API") exposed by web services platform 808 for performing the configuration operations. Other mechanisms for configuring the operation of web services platform 808, including launching new virtual machine instances on web services platform 808, may also be utilized.

According to embodiments disclosed herein, capacities of purchased compute resources provided by web services platform 808 can be scaled in response to demand. In this regard, scaling refers to the process of instantiating, which may also be referred to herein as "launching" or "creating," or terminating, which may also be referred to herein as "de-scaling," instances of compute resources in response to demand.

Web services platform 808 may also be configured with a deployment component to assist entities in the deployment of new instances of compute resources. The deployment component may receive a configuration from an entity that may include data describing how new instances should be configured. For example, the configuration may specify one or more applications or software components that should be installed in new instances, provide scripts and/or other types of code to be executed in new instances, provide cache warming logic specifying how an application cache should be prepared and other types of information. The deployment component utilizes the entity-provided configuration and cache warming logic to launch, configure and prime new instances of compute resources.

FIG. 9 depicts a computing system diagram that illustrates one configuration for datacenter 802 that implements web services platform 808. With regards to elements of the web services platform previously described with respect to FIG. 1, host computer 110 may be a server computer 902 of FIG. 9 (which itself may be computer 1000 of FIG. 10), host partition 112 may be an instance of instance manager 908 (where a host partition serves a hypervisor-type role), and VM instances 114A and 114B may each be an instance 906 of FIG. 9. Network infrastructure 108 of FIG. 1 may be local area network 916 of FIG. 9, and TCP performance auditor 116 of FIG. 1 may be server computer 904 of FIG. 9.

The example datacenter 802 shown in FIG. 9 may include several server computers 902A-902N, which may be referred herein singularly as "server computer 902" or in the plural as "server computers 902," for providing compute resources for hosting virtual clouds and for executing applications. Server computers 902 may be standard tower or rack-mount server computers configured appropriately for providing the compute resources described above. For instance, in one implementation server computers 902 may be configured to provide instances 906A-906N of compute resources.

Instances 906A-906N, which may be referred herein singularly as "instance 906" or in the plural as "instances 906," may be virtual machine instances. As known in the art, a virtual machine instance is an instance of a software implementation of a machine (i.e., a computer) that executes programs like a physical machine. In the example of virtual machine instances, each server 902 may be configured to execute an instance manager 908 capable of executing the instances. Instance manager 908 may be a hypervisor or another type of program configured to enable the execution of multiple instances 906 on a single server 902, for example. As discussed above, each of instances 906 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein may be utilized with instances of storage resources, instances of data communications resources and with other types of resources. The embodiments disclosed herein may also execute all or a portion of an application directly on a computer system without utilizing virtual machine instances.

Datacenter 802 shown in FIG. 9 may also include a server computer 904 reserved for executing software components for managing the operation of datacenter 802, server computers 902 and instances 906. In particular, server computer 904 may execute a management component 910. As discussed above, working between FIG. 8. and FIG. 9, an entity of web services platform 808 may utilize customer computing system 804 to access management component 910 to configure various aspects of the operation of web services platform 808 and instances 906 purchased by the entity. For example, the entity may purchase instances and make changes to the configuration of the instances. The entity may also specify settings regarding how the purchased instances are to be scaled in response to demand. The entity may also provide requests to launch instances to management component 910.

As also described briefly above, an auto scaling component 912 may scale instances 906 based upon rules defined by an entity of web services platform 808. For example, auto scaling component 912 may allow an entity to specify scale up rules for use in determining when new instances should be instantiated and scale down rules for use in determining when existing instances should be terminated.

As discussed briefly above, datacenter 802 may also be configured with a deployment component 914 to assist entities in the deployment of new instances 906 of compute resources. Deployment component 914 may receive a configuration from an entity that includes data describing how new instances 906 should be configured. For example, the configuration may specify one or more applications that should be installed in new instances 906, provide scripts and/or other types of code to be executed for configuring new instances 906, provide cache warming logic specifying how an application cache should be prepared and other types of information.

Deployment component 914 may utilize the entity-provided configuration and cache warming logic to configure, prime and launch new instances 906. The configuration, cache warming logic and other information may be specified by an entity using management component 910 or by providing this information directly to deployment component 914. Other mechanisms may also be utilized to configure the operation of deployment component 914.

In the example datacenter 802 shown in FIG. 9, an appropriate LAN (local area network) 916 may be utilized to interconnect server computers 902A-902N and server computer 904. LAN 916 may also be connected to WAN 806 illustrated in FIG. 8. It should be appreciated that the network topology illustrated in FIGS. 8 and 9 has been greatly simplified and that many more networks and networking devices may be utilized to interconnect the various computing systems disclosed herein. Appropriate load balancing devices or software modules may also be utilized for balancing a load between each of datacenters 802A-802N, between each of server computers 902A-902N in each datacenter 802 and between instances 906 purchased by each entity of web services platform 808. These network topologies and devices should be apparent to those skilled in the art.

It should be appreciated that datacenter 802 described in FIG. 9 is merely illustrative and that other implementations may be utilized. In particular, functionality described herein as being performed by management component 910, auto scaling component 912 and deployment component 914 may be performed by one another, may be performed by other components or may be performed by a combination of these or other components. Additionally, it should be appreciated that this functionality may be implemented in software, hardware or a combination of software and hardware. Other implementations should be apparent to those skilled in the art.

FIG. 10 depicts an example computer architecture for a computer 1000 capable of executing the above-described software components. With regard to the example web services platform described with respect to FIG. 1, host computer 110 and TCP performance auditor 116, as well as customer computer-A 102A, and customer computer-B 102B may each be implemented in computer 1000 of FIG. 10.

The computer architecture shown in FIG. 10 illustrates a conventional server computer, workstation, desktop computer, laptop, tablet, network appliance, PDA, e-reader, digital cellular phone or other computing node, and may be utilized to execute any aspects of the software components presented herein described as executing within datacenters 802A-802N, on server computers 902A-902N, on the customer computing system 804 or on any other computing system mentioned herein.

Computer 1000 may include a baseboard, or "motherboard," which is a printed circuit board to which a multitude of components or devices may be connected by way of a system bus or other electrical communication paths. One or more central processing units ("CPUs") 1004 may operate in conjunction with a chipset 1006. CPUs 1004 may be standard programmable processors that perform arithmetic and logical operations necessary for the operation of computer 1000.

CPUs 1004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units and the like.

Chipset 1006 may provide an interface between CPUs 1004 and the remainder of the components and devices on the baseboard. Chipset 1006 may provide an interface to a random access memory ("RAM") 1008 used as the main memory in computer 1000. Chipset 1006 may further provide an interface to a computer-readable storage medium such as a read-only memory ("ROM") 1020 or non-volatile RAM ("NVRAM") for storing basic routines that may help to start up computer 1000 and to transfer information between the various components and devices. ROM 1020 or NVRAM may also store other software components necessary for the operation of computer 1000 in accordance with the embodiments described herein.

Computer 1000 may operate in a networked environment using logical connections to remote computing nodes and computer systems through network 916. Chipset 1006 may include functionality for providing network connectivity through a network interface controller ("NIC") 1022, such as a gigabit Ethernet adapter. NIC 1022 may be capable of connecting the computer 1000 to other computing nodes over network 916. It should be appreciated that multiple NICs 1022 may be present in computer 1000, connecting the computer to other types of networks and remote computer systems.

Computer 1000 may be connected to a mass storage device 1028 that provides non-volatile storage for the computer. Mass storage device 1028 may store system programs, application programs, other program modules and data which have been described in greater detail herein. Mass storage device 1028 may be connected to computer 1000 through a storage controller 1024 connected to chipset 1006. Mass storage device 1028 may consist of one or more physical storage units. Storage controller 1024 may interface with the physical storage units through a serial attached SCSI ("SAS") interface, a serial advanced technology attachment ("SATA") interface, a fiber channel ("FC") interface or other type of interface for physically connecting and transferring data between computers and physical storage units.

Computer 1000 may store data on mass storage device 1028 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 1028 is characterized as primary or secondary storage and the like.

For example, computer 1000 may store information to mass storage device 1028 by issuing instructions through storage controller 1024 to alter the magnetic characteristics of a particular location within a magnetic disk drive unit, the reflective or refractive characteristics of a particular location in an optical storage unit or the electrical characteristics of a particular capacitor, transistor or other discrete component in a solid-state storage unit. Other transformations of physical media are possible without departing from the scope and spirit of the present description, with the foregoing examples provided only to facilitate this description. Computer 1000 may further read information from mass storage device 1028 by detecting the physical states or characteristics of one or more particular locations within the physical storage units.

In addition to mass storage device 1028 described above, computer 1000 may have access to other computer-readable storage media to store and retrieve information, such as program modules, data structures or other data. It should be appreciated by those skilled in the art that computer-readable storage media can be any available media that provides for the storage of non-transitory data and that may be accessed by computer 1000.

By way of example and not limitation, computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage, other magnetic storage devices or any other medium that can be used to store the desired information in a non-transitory fashion.

Mass storage device 1028 may store an operating system utilized to control the operation of the computer 1000. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 1028 may store other system or application programs and data utilized by computer 1000, such as management component 910 and/or the other software components described above.

Mass storage device 1028 or other computer-readable storage media may also be encoded with computer-executable instructions, which, when loaded into computer 1000, transforms the computer from a general-purpose computing system into a special-purpose computer capable of implementing the embodiments described herein. These computer-executable instructions transform computer 1000 by specifying how CPUs 1004 transition between states, as described above. Computer 1000 may have access to computer-readable storage media storing computer-executable instructions, which, when executed by computer 1000, may perform operating procedures depicted in FIGS. 2-4.

Computer 1000 may also include an input/output controller 1032 for receiving and processing input from a number of input devices, such as a keyboard, a mouse, a touchpad, a touch screen, an electronic stylus or other type of input device. Similarly, input/output controller 1032 may provide output to a display, such as a computer monitor, a flat-panel display, a digital projector, a printer, a plotter or other type of output device. It will be appreciated that computer 1000 may not include all of the components shown in FIG. 10, may include other components that are not explicitly shown in FIG. 10 or may utilize an architecture completely different than that shown in FIG. 10.

As described herein, a computing node may be a physical computing node, such as computer 1000 of FIG. 10. A computing node may also be a virtual computing node, such as a virtual machine instance, or a session hosted by a physical computing node, where the computing node is configured to host one or more sessions concurrently.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware or a combination of software and hardware. Other implementations should be apparent to those skilled in the art. It should also be appreciated that a server, gateway or other computing node may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the operations, processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method for adjusting Transmission Control Protocol (TCP) parameters in a TCP connection, comprising:
   determining information indicative of latency or throughput capacity for a network link between a first computing node and a second computing node prior to establishing the TCP connection between the first computing node and the second computing node;
   determining a value of a TCP parameter for the TCP connection between the first computing node and the second computing node over the network link, the value being based on the information indicative of latency or throughput capacity;
   configuring the TCP connection between the first computing node and the second computing node to produce a configured TCP connection, the configured TCP connection being configured based at least in part on the value of the TCP parameter;
   transmitting at least an initial data packet over the configured TCP connection, and
   sending, based on a commonality of a third computing node and the first computing node, an indication of the value of the parameter to the third computing node, wherein the third computing node uses the value of the parameter to configure one or more additional TCP connections.

2. The method of claim 1, further comprising:
   storing, by the first computing node, an indication of the value of the TCP parameter in a route table that the first computing node uses to route data to a given destination; and
   wherein configuring the TCP connection between the first computing node and the second computing node comprises:
   determining the value of the TCP parameter based on accessing the route table for an entry that corresponds to a network address of the second computing node.

3. A system, comprising:
   a processor; and
   a memory bearing instructions that, upon execution by the processor, cause the system at least to:
   determine information indicative of a characteristic of a network link between a first computing node and a second computing node prior to establishing a network protocol connection between the first computing node and the second computing node;
   determine a value of a parameter for the network protocol connection between the first computing node and the second computing node over the network link, the value being based on the information indicative of the characteristic of the network link;
   configure the network protocol connection between the first computing node and the second computing node to produce a configured network protocol connection, the configured network protocol connection being configured based at least in part on the value of the parameter;
   transmit at least an initial data packet over the configured network protocol connection; and
   send, based on a commonality of a third computing node and the first computing node, an indication of the value of the parameter to the third computing node, wherein the third computing node uses the value of the parameter to configure one or more additional network protocol connections.

4. The system of claim 3, wherein the instructions that, upon execution by the processor, cause the system at least to determine the information indicative of the characteristic of the network link further cause the system at least to:
   determine the information indicative of the characteristic of the network link based on sending data between the first computing node and the second computing node in a second connection via the network link, before establishing the network protocol connection.

5. The system of claim 3, wherein the instructions that, upon execution by the processor, cause the system at least to determine the value of the parameter further cause the system at least to:
   determine a model of at least a portion of the network link; and
   determine the information indicative of the characteristic of the network link based on the model of the network link.

6. The system of claim 3, wherein the instructions that, upon execution by the processor, cause the system at least to determine the information indicative of the characteristic of the network link further cause the system at least to:
   determine the information indicative of the characteristic of the network link based on receiving user input indicative of the information indicative of the characteristic of the network link, or by automatically discovering the information indicative of the characteristic of the network link independently of modeling at least a portion of the network link or sending data between the first computing node and the second computing in a second connection via the network link.

7. The system of claim 3, wherein the memory further bears instructions that, upon execution by the processor, cause the system at least to:
   determine that the third computing node shares the commonality with the first computing node; and
   determine that the third computing node is to use the value of the parameter in configuring a second connection of the one or more additional connections, in response to determining that the third computing node shares the commonality with the first computing node.

8. The system of claim 7, wherein the second connection is to be configured between the third computing node and a fourth computing node, and wherein the instructions that, upon execution by the processor, cause the system at least to determine that the third computing node is to use the value of the parameter in configuring the second connection further cause the system at least to:
   determine that the third computing node is to use the value of the parameter in configuring the second connection in response to determining that the fourth computing node shares a second commonality with the second computing node.

9. The system of claim 7, wherein the instructions that, upon execution by the processor, cause the system at least to determine that the third computing node shares the commonality with the first computing node further cause the system at least to:
 determine that the first computing node and the third computing node have a same or a similar hardware configuration.

10. The system of claim 7, wherein the instructions that, upon execution by the processor, cause the system at least to determine that the third computing node shares the commonality with the first computing node further cause the system at least to:
 determine that the first computing node and the third computing node have a same or a similar software configuration.

11. The system of claim 7, wherein the instructions that, upon execution by the processor, cause the system at least to determine that the third computing node shares the commonality with the first computing node further cause the system at least to:
 determine that the first computing node and the third computing node have a same or a similar physical location.

12. The system of claim 3, wherein the instructions that, upon execution by the processor, cause the system at least to determine the value of the parameter further cause the system at least to:
 determine the value of a round-trip time (RTT) of at least the initial data packet sent via the configured network protocol connection.

13. The system of claim 3, wherein the instructions that, upon execution by the processor, cause the system at least to determine the value of the parameter further cause the system at least to:
 determine the value of a window size for at least the initial data packet sent via the configured network protocol connection.

14. The system of claim 3, wherein the instructions that, upon execution by the processor, cause the system at least to determine the value of the parameter further cause the system at least to:
 determine the value of a maximum segment size (MSS) of at least the initial data packet sent via the configured network protocol connection.

15. The system of claim 3, wherein the instructions that, upon execution by the processor, cause the system at least to determine the value of the parameter further cause the system at least to:
 determine a maximum number of timeouts to attempt to send at least the initial data packet via the configured network protocol connection.

16. A non-transitory computer-readable storage medium, bearing computer-executable instructions that, upon execution, cause the performance of operations comprising:
 determining information indicative of a characteristic of a network link between a first computing node and a second computing node prior to establishing a network protocol connection between the first computing node and the second computing node;
 determining a value of a parameter for the network protocol connection between the first computing node and the second computing node over the network link, the value being based on the information about the characteristic of the network link, wherein configuring the network protocol connection between the first computing node and the second computing node to produce a configured network protocol connection is performed based at least in part on the value of the parameter;
 transmitting at least an initial data packet over the configured network protocol connection; and
 sending, based on a commonality of a third computing node and the first computing node, an indication of the value of the parameter to the third computing node, wherein the third computing node uses the value of the parameter to configure one or more additional network protocol connections.

17. The non-transitory computer-readable storage medium of claim 16, further bearing computer-executable instructions that, upon execution, cause the performance of operations comprising:
 storing, by the first computing node, an indication of the value of the parameter in a route table that the first computing node uses to route data to a given destination; and
 wherein configuring the network protocol connection between the first computing node and the second computing node comprises:
 determining the value of the parameter based on accessing the route table for an entry that corresponds to a network address of the second computing node.

18. The non-transitory computer-readable storage medium of claim 16, further bearing computer-executable instructions that, upon execution, cause the performance of operations comprising:
 storing, by the first computing node, an indication of the value of the parameter in a data store that associates a given destination with the value of the parameter, the data store being separate from a route table; and
 wherein configuring the network protocol connection between the first computing node and the second computing node comprises:
 determining the value of the parameter based on accessing the data store for an entry that corresponds to a network address of the second computing node.

19. The non-transitory computer-readable storage medium of claim 18, wherein determining the value of the parameter based on accessing the data store for the entry that corresponds to the network address of the second computing node comprises:
 accessing the data store for the entry that corresponds to the network address of the second computing node based on performing longest-prefix matching to determine the entry that corresponds to the network address of the second computing node.

20. The non-transitory computer-readable storage medium of claim 16, further bearing computer-executable instructions that, upon execution, cause the performance of operations comprising:
 storing an indication of the value of the parameter in a storage location that is accessible to the first computing node via the network link or a second network link, the first computing node configuring the network protocol connection.

21. The non-transitory computer-readable storage medium of claim 16, further bearing computer-executable instructions that, upon execution, cause the performance of operations comprising:
 receiving data about network performance of the first computing node;

receiving data about network performance of the third computing node;

aggregating the data about the network performance of the first computing node and the data about the network performance of the third computing node to produce an aggregated data; and using the aggregated data to determine a second value of the parameter or a value for a second parameter for a fourth computing node.

22. The non-transitory computer-readable storage medium of claim 16, further bearing computer-executable instructions that, upon execution, cause the performance of operations comprising:

performing one or more tests, by the first computing node, to determine how various values of the parameter affects network performance; and wherein transmitting at least the initial data packet over the configured network protocol connection comprises:

transmitting at least the initial data packet over the configured network protocol connection, the configured network protocol connection being adjusted based at least in part on a best result of the one or more tests.

23. The non-transitory computer-readable storage medium of claim 16, further bearing computer-executable instructions that, upon execution, cause the performance of operations comprising:

determining the value of the parameter for a plurality of computing nodes that include the first computing node; and determining the value of the parameter for each computing node of the plurality of computing nodes based on determining the value of the parameter for the network protocol connection between the first computing node and the second computing node, in response to determining that each computing node of the plurality of computing nodes shares a commonality.

24. The non-transitory computer-readable storage medium of claim 23, wherein determining that each computing node of the plurality of computing nodes shares the commonality comprises:

determining that each computing node of the plurality of computing nodes shares a similar physical location.

25. The non-transitory computer-readable storage medium of claim 16, further bearing computer-executable instructions that, upon execution, cause the performance of operations comprising:

determining that the value of the parameter for a maximum segment size (MSS) should decrease in response to determining that cryptographic tunneling will be used between the first computing node and the second computing node.

26. The non-transitory computer-readable storage medium of claim 16, wherein the first computing node comprises a virtual machine (VM) instance hosted by a host computing node, and wherein configuring the network protocol connection comprises:

configuring, by the host computing node, the network protocol connection based at least in part on the value of the parameter, the first computing node lacking configuration to configure the network protocol connection based at least in part on the value of the parameter; and receiving, by the host computing node, at least part of the initial data packet from the first computing node, via a virtualized network interface card (NIC) that implements a TCP offload engine (TOE).

* * * * *